B. & A. GUSTIANA.
COMPOSITION OF MATTER TO BE USED FOR TILES.
APPLICATION FILED SEPT. 28, 1908.

933,979. Patented Sept. 14, 1909.

UNITED STATES PATENT OFFICE.

BENJAMIN GUSTIANA AND ANTHONY GUSTIANA, OF HAMILTON, ONTARIO, CANADA.

COMPOSITION OF MATTER TO BE USED FOR TILES.

933,979.     Specification of Letters Patent.     Patented Sept. 14, 1909.

Application filed September 28, 1908. Serial No. 455,012.

*To all whom it may concern:*

Be it known that we, BENJAMIN GUSTIANA and ANTHONY GUSTIANA, both citizens of the United States, and residents of Hamilton, in the county of Wentworth and Province of Ontario, Canada, have invented a new and useful Composition of Matter to be Used for Tiles, of which the following is a specification.

Our composition consists of the following ingredients, combined in the proportions stated, namely: First, Portland cement, 97 parts; chlorid of lime, 1 part; waterproof compound, 2 parts; pure water, 8 parts. Second, Portland cement, 33 parts; fine gravel, 67 parts; water, 8 parts.

The first three ingredients are to be thoroughly mixed and mingled together by agitation and then adding a sufficient quantity of pure water thereto to assist in co-mingling the said parts and cause the same to amalgamate and adhere together, thereby forming the first plastic member of a body rendered antiseptic by the said chlorid of lime. A suitable coloring may be added to the mixture, if desired. The mixture is then placed in a mold, say eight inches square and one inch and one half deep, to about one half the depth of the mold, the bottom of the mold representing the finished face of the tile when pressed. The second portion of the ingredients, namely, Portland cement, fine gravel and water are thoroughly mixed and mingled together by agitation, thereby forming the second plastic member of the body, is then placed on the top of the first mentioned composition and in the mold to form a back ground to the tile. Then the two compositions or members are pressed together by powerful pressure, thereby solidifying the same into one solid body or tile, about three fourths of one inch in thickness.

Reference is made to the accompanying drawing in which:—

Figure 1:
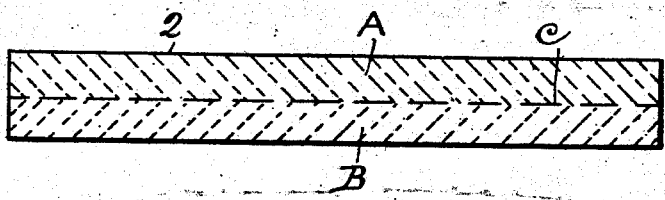
Figure 2:
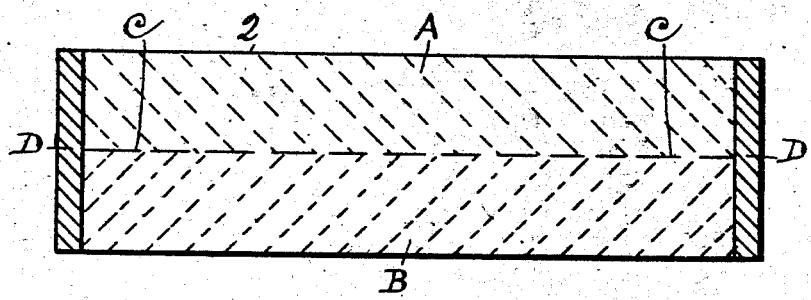

Figure 1 is a sectional elevation of a finished tile. Fig. 2 is a sectional elevation of the same in a mold previous to compression of the material in said mold.

Similar letters refer to similar parts throughout the views.

In the drawing the first mentioned plastic member is indicated by A. and the second mentioned plastic member by B. The centrally located broken horizontal line C. in both said figures indicates the imaginary divisional line between the said members of one body.

D indicates a mold into which is placed the two separate plastic members, previous to pressure being brought on said members, to amalgamate the same into one solid body. When being molded by pressure the face 2 is preferably on the bottom.

Various shapes of tiles may be made, and of various colors, and various colored patterns and designs in one tile may be made.

We claim:

1. The process herein described of making floor tiles, composed of Portland cement, chlorid of lime, water proof compound and water, thoroughly mixed together to form a first plastic member, for the face of the tile, and a separately prepared composition of matter consisting of Portland cement, fine gravel and water thoroughly mixed together to form a second plastic member, for the back ground of the tile, the said second member placed upon the said first member, then subjected to pressure to form one solid body, substantially as and for the purpose specified.

2. The process herein described of making floor tiles, composed of Portland cement, chlorid of lime, water proof compound and pure water, all thoroughly mixed together for a facing, a separate plastic member consisting of Portland cement, gravel and water thoroughly mixed together for the back ground of the tile, both said members then pressed together by pressure to form one solid body, substantially as described.

BENJAMIN GUSTIANA.
               ANTHONY GUSTIANA.

Witnesses:
  JOHN H. HENDRY,
  RICHARD BUTLER.